United States Patent [19]
Phillips

[11] 3,956,926
[45] May 18, 1976

[54] STRESS MEASURING APPARATUS

[76] Inventor: Oliver V. Phillips, 10405 W. 32nd Ave., Wheat Ridge, Colo. 80033

[22] Filed: Oct. 29, 1974

[21] Appl. No.: 518,635

[52] U.S. Cl. .............................................. 73/88 E
[51] Int. Cl.² ........................................ G01B 5/30
[58] Field of Search .............. 73/152, 88 E, 88 C, 73/408, 406; 92/103 M, 98 R

[56] References Cited
UNITED STATES PATENTS

| | | | |
|---|---|---|---|
| 2,565,847 | 8/1951 | Hilgert | 92/98 R |
| 2,927,459 | 3/1960 | Farrington | 73/88 E |
| 2,957,341 | 10/1960 | Menard | 73/88 E |
| 3,324,727 | 6/1967 | Smith et al. | 73/407 R |

Primary Examiner—James J. Gill
Assistant Examiner—Anthony V. Ciarlante
Attorney, Agent, or Firm—Vinson, Elkins, Searls, Connally & Smith

[57] ABSTRACT

An apparatus for measuring the stress changes in an underground formation or in concrete or other structures such as bridges, tunnels or the like which includes a sensor unit having a stress or pressure sensitive element exposed to the area under measurement and a hydraulic measurement system actuated by said element so that changes in stress forces or pressure in said area are reflected by changes in the hydraulic measuring system, and a means for converting the changes in said hydraulic system into a visible or recorded indication of said changes to thereby provide a measurement of the stress or pressure changes.

13 Claims, 12 Drawing Figures

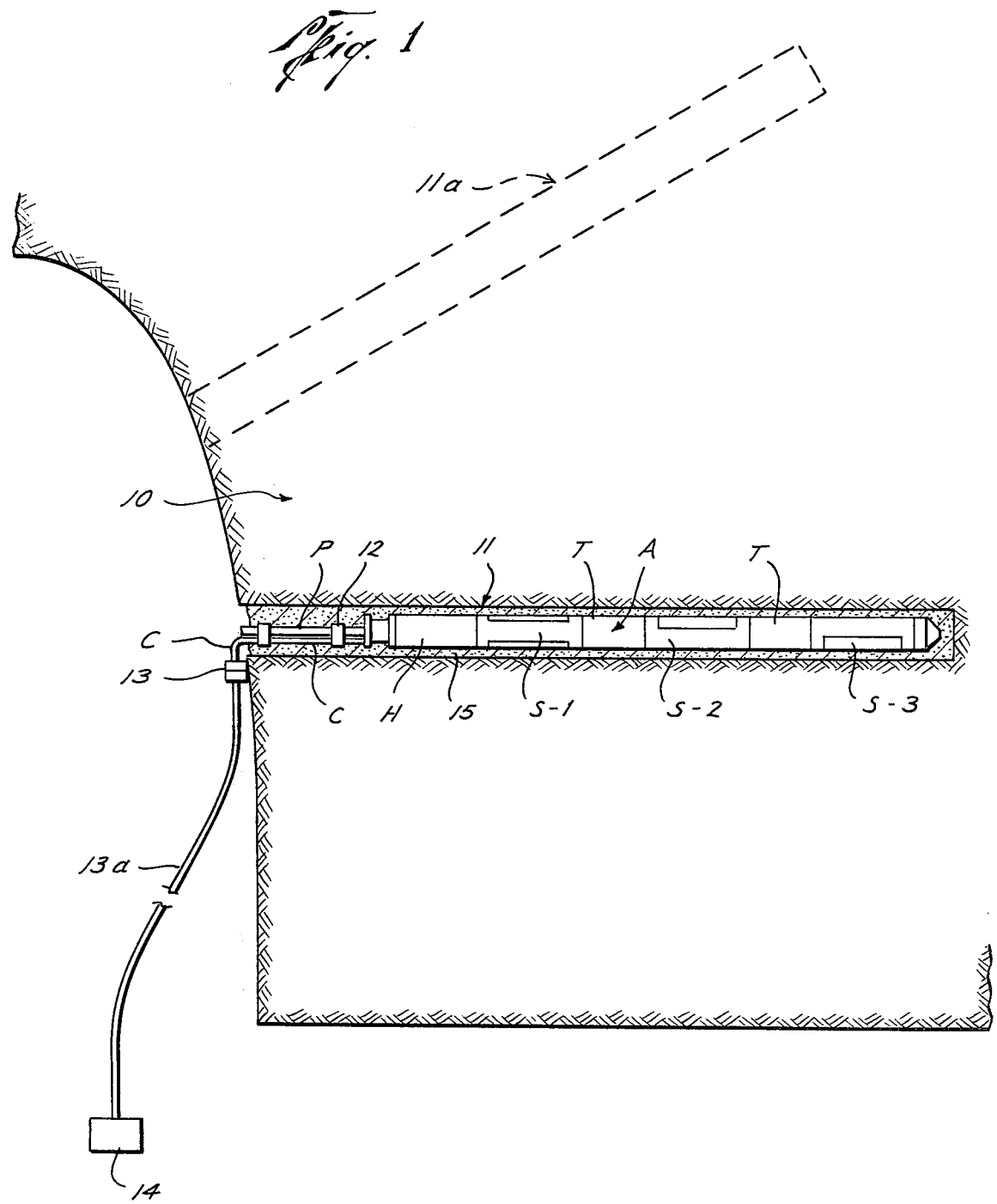

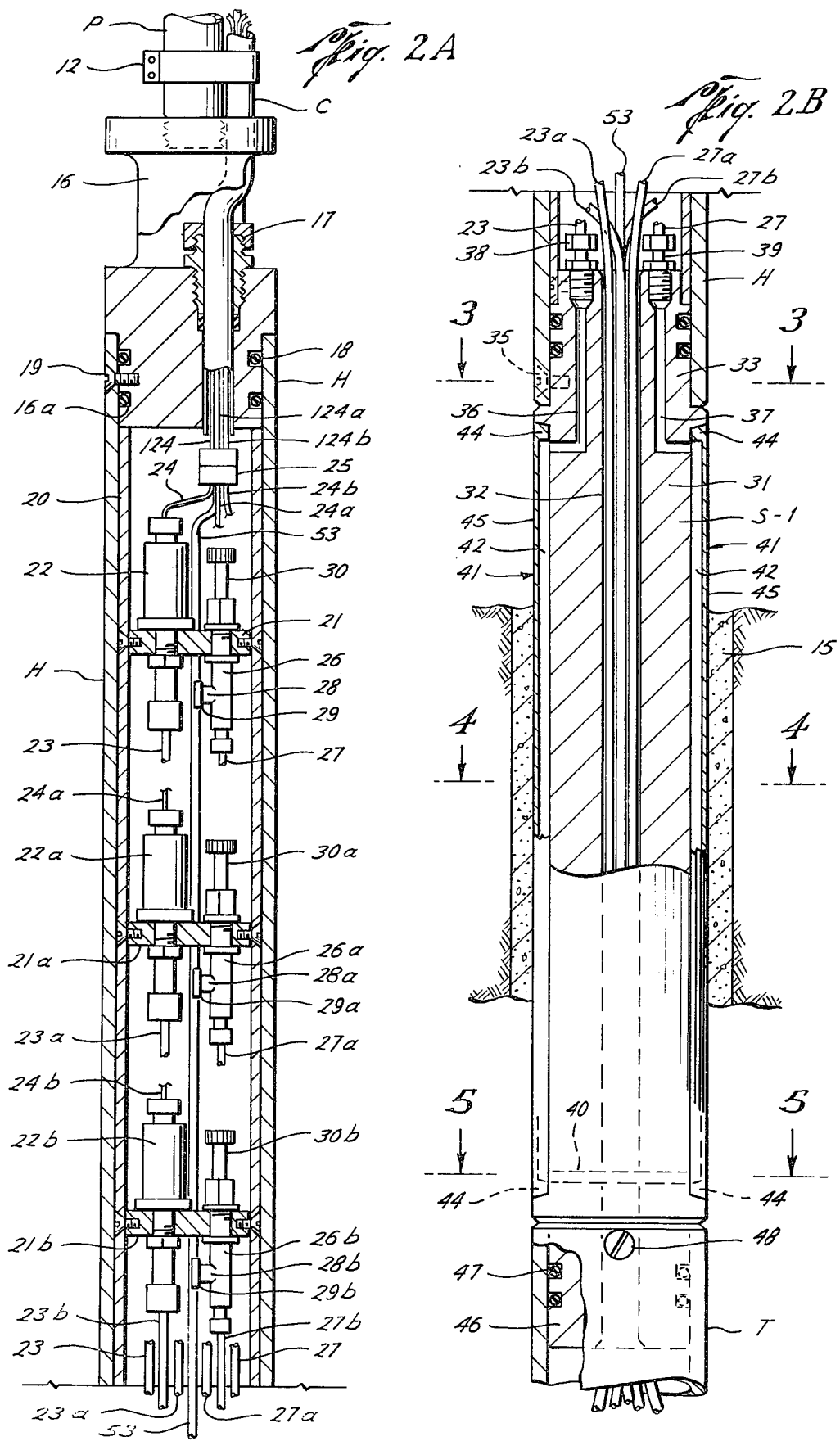

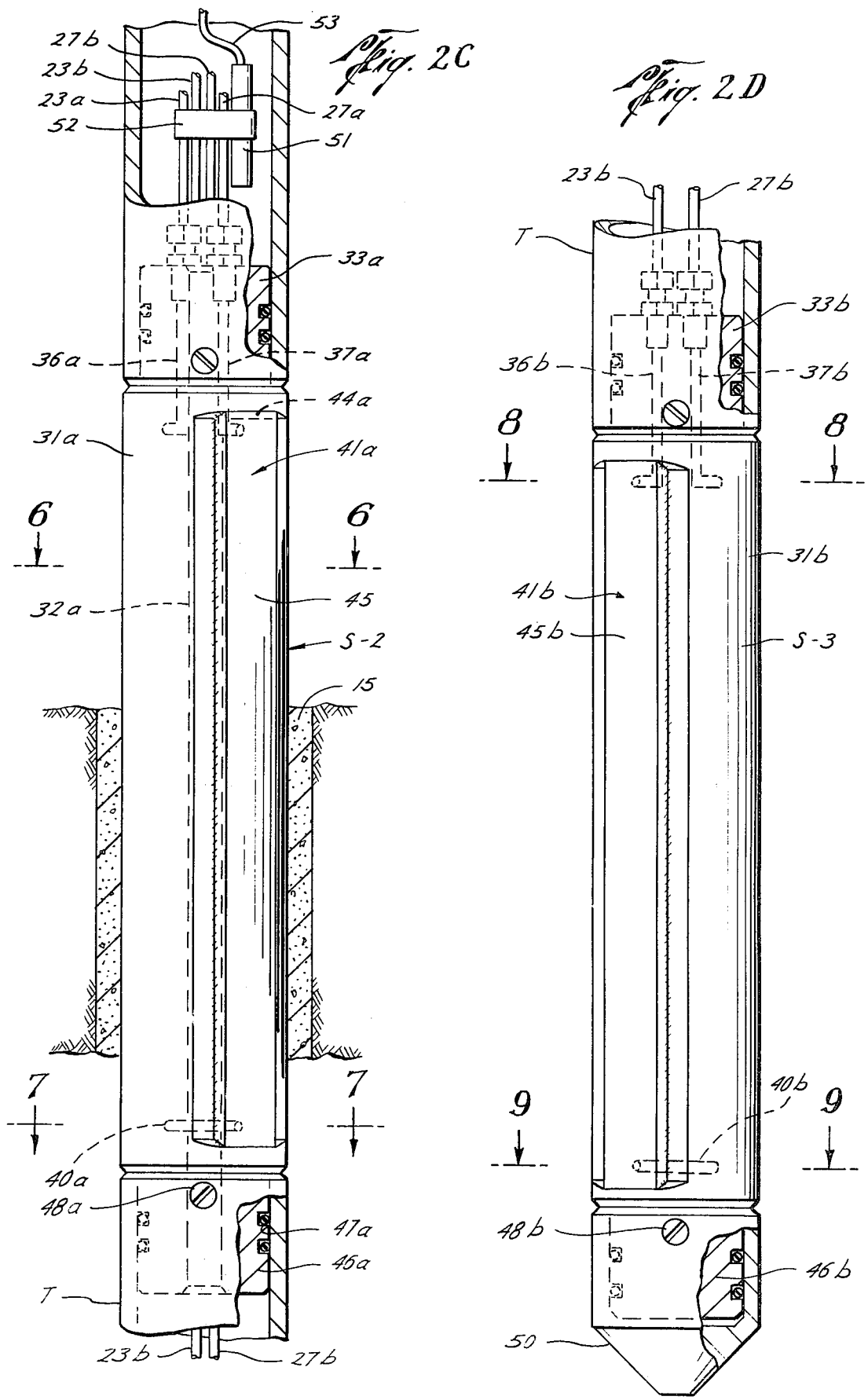

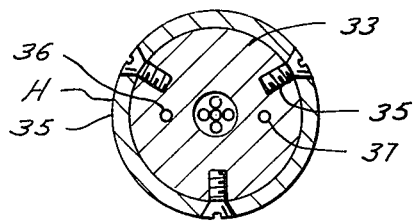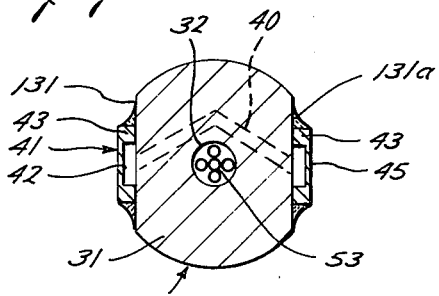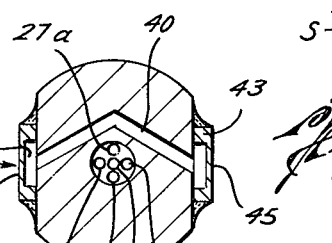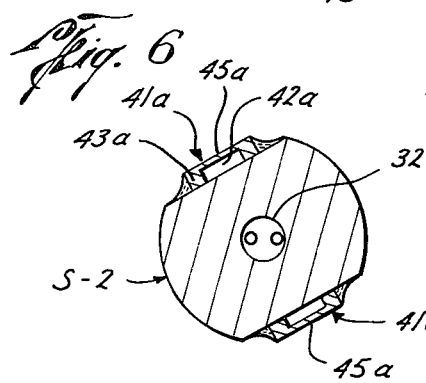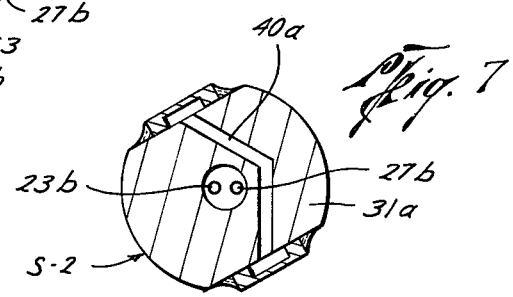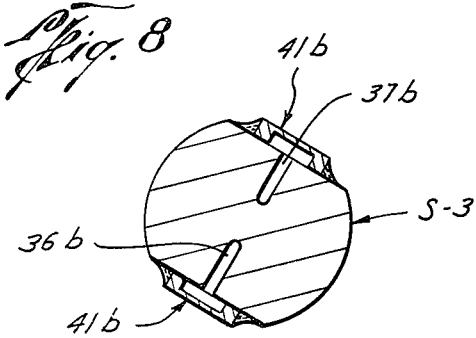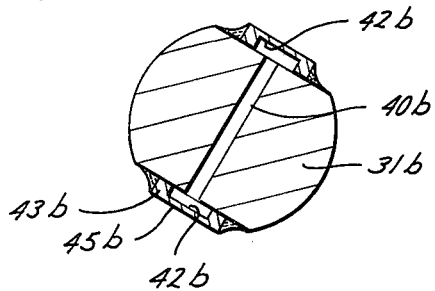

STRESS MEASURING APPARATUS

BACKGROUND OF THE INVENTION

Various types of apparatus have been used in an attempt to measure the changes in stress forces or pressure within underground formations or other areas such as concrete structures. Most of the prior devices have included the usual strain gauges but as is well known, such strain gauges are rather delicate and do not have a great deal of mechanical strength with the result that any attempts to obtain measurements in areas subjected to relatively high stress changes have resulted in a destruction of the strain gauge device.

Some attempts have been made to construct apparatus of high mechanical strength which will withstand relatively high forces by utilizing a hydraulic system combined with a stress or pressure sensitive element which is exposed to the area under measurement; any stress changes which occur and which act upon the pressure sensitive element are transmitted to the hydraulic system to cause changes in hydraulic pressure which is then converted to a visible indication or record of stress changes.

Although the hydraulic system type apparatus is effective, problems are presented in constructing the apparatus with sufficient sensitivity to provide accurate measurements. To provide sensitivity and accuracy in measuring relatively small changes, the sensing element which is exposed to the area under measurement must necessarily be relatively thin or flexible so as to be readily responsive to minor variations. When so constructed to provide the desired sensitivity difficulty is experienced in attaching this plate to the apparatus in a manner to resist damage or even total collapse under relatively high pressure changes. Therefore, all prior units which have attempted to employ the hydraulic system type of sensing apparatus and which have the necessary sensitivity for obtaining accurate measurements of small variations have lacked overall mechanical strength to withstand high stress changes.

SUMMARY OF THE INVENTION

The present invention provides an apparatus for measuring the stress or pressure changes in an underground formation or in concrete or other structures such as bridges, tunnels or the like which includes a sensor unit having a high mechanical strength and at the same time having excellent sensitivity of measurement.

OBEJCTS OF THE INVENTION

It is the primary object of this invention to provide a stress or pressure measuring apparatus which is constructed so as to have substantial strength and resistance to distortion or destruction by earth movements of sizable magnitude while providing extreme sensitivity of measurement to accurately detect and measure relatively small stress changes.

An important object is to provide a stress measuring apparatus in which the sensing unit may be placed within an underground formation, either within a bore hole or at any angle to the wall, ceiling or floor of the area under measurement and which will effectively measure changes in the stress or pressure of the area which surrounds the apparatus.

A further object of the invention is to provide a stress measuring apparatus of high mechanical strength, within the apparatus may remain at a given location indefinitely and may be monitored either continuously or periodically to detect, measure and record stress changes, with the indication or recording being located at a point remote from the area under investigation; this arrangement making the apparatus particularly adaptable for use in underground formations such as tunnels, mine shafts and the like.

Another object is to provide a stress measuring apparatus which may include a plurality of sensor units capable of being spaced longitudinally along the length of the tool at any desired or selected distances to suit the conditions of the particular strata, formation, or area which is under investigation.

A further object is to provide a stress measuring apparatus including a plurality of sensor units which are spaced longitudinally from each other, with each sensor unit having its sensor element or elements located in a different radial plane or planes than that of the sensor element or elements of the other units, whereby the sensor elements of all sensor units function to provide measurements in substantially all areas circumferentially of the tool.

Still another object is to provide a stress measuring apparatus of the character described, wherein the sensor element or elements of the sensor unit may be oriented within the particular area so that the stress measurements are taken along a known direction or plane.

A particular object is to provide a stress measuring apparatus of the character described wherein each sensor element is welded to the body in an improved manner to provide high mechanical strength without loss of sensitivity of measurement; the particular structure lending itself to the variation of the thickness, hardness or softness of the material of that portion of the sensor element exposed to the stress forces, whereby the apparatus may be constructed to accurately measure stresses in different formations and under different geological or other conditions.

A still further object of the innvention is to provide a stress measuring tool of the character described wherein each sensor unit is connected to other sensor units through an improved and simplified connecting means to facilitate assembly and desired positioning of the sensor units, and also wherein each sensor unit has its own independent indication of stress forces whereby accurate measurements are taken opposite the point of the location of each sensor unit; the tool lending itself to the use of temperature sensors which may be located in the tool and which will provide temperature information along with stress change measurements.

A preferred embodiment of the invention is illustrated in the drawings wherein:

FIG. 1 is a cross-sectional view taken through the wall of a sub-surface earth formation and showing a stress measuring apparatus, constructed in accordance with the invention, in place within said formation.

FIG. 2A is a view partly in section and partly in elevation of the upper portion of a stress measuring tool, constructed in accordance with the invention and illustrating the transducers and pressure control valves which are utilized in connection with the sensor units of the apparatus.

FIG. 2B is an extension of FIG. 2A and is a view partly in section and partly in elevation showing the first sensor unit of the apparatus.

FIG. 2C is an extension of FIG. 2B, also partly in section and partly in elevation and showing the second sensor unit of the apparatus to illustrate the different radial positions of the sensor elements of this unit with respect to the first sensor unit.

FIG. 2D is an extension of FIG. 2C and is an elevation again illustrating the different radial positions of the sensor elements of the third sensor unit with respect to the first and second units.

FIGS. 3, 4 and 5 are horizontal cross-sectional views taken on the lines 3—3, 4—4 and 5—5, respectively, of FIG. 2B to illustrate the passages and spaces of the sensor unit of FIG. 2B which passages and spaces contain hydraulic pressure fluid.

FIGS. 6 and 7 are horizontal cross-sectional views taken on the lines 6—6 and 7—7, respectively, of FIG. 2C to illustrate the passages and spaces containing hydraulic fluid and located in the second sensor unit; and FIGS. 8 and 9 are horizontal cross-sectional views taken on the lines 8—8 and 9—9, respectively, of FIG. 2D and illustrating the hydraulic-containing passages and spaces of the third sensor unit.

DESCRIPTION OF THE PREFERRED EMBODIMENT

In the drawings, the numeral 10 designates an underground formation or structure, such as a tunnel wall, within which stress measurements are to be taken. A lateral bore 11 is drilled in the formation for the reception of the stress-measuring apparatus or tool assembly which is generally indicated by the letter A. The bore 11 is shown as extending in a horizontal plane, but since the apparatus A will function at any angle, it could be located at any angle, as for example, at the angle shown by the dotted lines 11a. The position of the bore in which the apparatus is to be inserted is determined by the area at which it is desired to determine stress conditions.

The apparatus A includes a housing H which has connection with a running-in pipe P and which carries one or more sensor units. As illustrated, three such units, S-1, S-2 and S-3, are shown, although more or less may be employed. The sensor units are separated a preselected or desired distance by spacer tubes T, and as will be explained, each sensor unit measures changes in stress forces in its particular area. The spacing of the sensor units locates such units to measure stress changes at desired areas along the longitudinal bore 11.

The housing H contains equipment which converts the measurements taken by the sensor units into electrical signals and the electrical conductors are contained within a conduit C which is secured by clamps 12 to the running-in pipe. The conduit terminates in a terminal plug 13 which is adapted to connect with the electrical cable 13a extending to a suitable, visible indicator 14; the indicator may be a well-known gauge type readout device or it may take the form of the usual recorder having a movable stylus which is actuated by the electrical signals. The indicator 14 is located at some point remote from the apparatus A, and if the plug 13 remains in connected position, the stress conditions are constantly monitored. However, the plug may be periodically connected to the indicator 14 so that the indications of stress changes may be checked at desired intervals.

After the bore 11 has been drilled, the apparatus A or tool assembly is inserted in said bore by means of the running-in pipe, and thereafter a grouting material 15 is injected into the bore to totally surround and encompass the apparatus. The grouting material is one which is compatible with the formation in which it is installed and is a material capable of hardening and solidifying so that the apparatus A is firmly embedded in the formation. With such arrangement, the apparatus is subjected to the stress forces within the formation and as will be explained, any changes in stress will act upon the sensor units S-1, S-2 and S-3 and will be indicated or recorded by the means 14. The apparatus A will remain in place so long as it is desired to measure stress forces. When the apparatus is to be removed, the grouting material may be drilled out to free the apparatus for withdrawal from the bore. As a practical matter, an apparatus of this type is normally located in a particular position and will remain there over a substantially long interval of time in order to constantly monitor stress changes.

Referring to FIGS. 2A – 2D which illustrate the structural details of the apparatus A, the running-in pipe (FIG. 2A) is connected to a guide coupling 16 through which the conduit C extends; the conduit is secured and sealed with respect to the coupling by a suitable connector 17. The lower reduced portion 16a of coupling 16 is insertable within the outer housing H and is sealed thereto by suitable O-rings 18. Fastening screws 19 extending through housing H fasten said housing to the coupling. An inner casing 20 is disposed within the housing H and contains the pressure transducers and hydraulic control and filling valves which are associated with the sensor units.

As shown in FIG. 2A, a transverse support 21 extends across the inner casing 20 and has a pressure transducer 22 supported thereon. The pressure transducer may be of any suitable construction and is a standard article of commerce which converts hydraulic pressure changes into electrical signal variations representative of such changes. One type of pressure transducer which has been found satisfactory for the purpose is manufactured by Standard Controls, Inc. of Seattle, Washington, and bears the part number 212-35-020-04, although it will be understood that any well-known pressure transducer which can perform the necessary function can be employed. The lower end of the transducer 22 is connected through a tubular conductor 23 with the hydraulic system of the first sensor unit S-1. The usual electrical cable 24 extends from the upper end of the transducer and has connection through a plug 25 with the cable 124 which is housed within the conduit C and which extends to the indicating means 14.

Also supported upon the partition 21 is a pressure control and filler valve 26. The lower end of the valve is connected through a tubing or conductor 27 with the hydraulic system of the first sensor unit S-1. The hydraulic system of the first sensor unit is filled through the usual inlet 28 of valve 26 which, after filling, is closed by the filler plug 29. The internal valve (not shown) of the valve unit 26 is adjusted by the usual pressure adjusting stem 30 so that the desired pressure may be maintained within the hydraulic system of the first sensor unit.

The housing H also contains a second pressure transducer 22a and a second pressure control and filler valve 26a which are mounted upon a transverse support 21a. The second transducer 22a has its lower end connected to a conductor 23a which extends, as will be explained, to the second sensor unit S-2. An electrical cable 24a extends from the upper end of transducer 22a to the plug 25 through which it is connected to a cable 124a extending through the conduit C to the indicating means.

The filler valve 26a has a tubular conductor 27a extending to the second sensor unit S-2 and is provided with an adjustable stem 30a for adjusting the pressure of the hydraulic system of said second sensor unit. The valve 26a includes a fill opening 28a which is normally closed by the plug 29a.

The housing H also contains a third pressure transducer 22b and a third pressure control and filler valve 26b which are mounted upon the transverse support 21b and which are associated with the third sensor unit S-3. These elements are substantial duplicates of the transducers 22 and 22a and the valves 26 and 26a. A fluid conductor 23b extends from the pressure transducer 22b to the hydraulic system of the sensor unit S-3, while an electrical cable 24b extends upwardly from the transducer to the connecting plug 25; the connecting plug makes a connection between cable 24b with a cable 124b which extends through the conduit C to the electrically operated indicating means 14. A conductor 27b extends from valve 26b to the hydraulic system of the third sensor unit S-3.

The first sensor unit S-1 is connected to the end of the housing H and comprises an elongate main body 31 having a central bore 32 extending entirely therethrough. The main portion of the body is formed with diametrically opposed flat sides 31a and 31b (FIG. 4). That end portion 33 of the body which is connected with the housing H is cylindrical and insertable within the bore of said housing with suitable O-rings 34 being mounted in grooves to effect a seal between the parts. Screws 35 (FIG. 3) extend through the housing and are threaded into said cylindrical portion 33 to secure the housing to the sensor unit. This type of connection is very simple in that only three screws need be removed in order to disconnect the housing from the sensor unit body 31.

A pair of angular passages 36 and 37 extend downwardly from the upper surface of the end portion 33 and are located diametrically opposite each other with their lower ends being directed radially outwardly to exit on the flat surfaces 31a and 31b respectively of the body 31. The upper end of the passage 36 has connection through a suitable coupling 38 with the fluid conductor 23 extending to the lower end of the pressure transducer 22, while the passage 37 has its upper end connected through a suitable connector 39 with the conductor 27 which extends from the pressure control and filler valve 26. At that end which is opposite the passages 36 and 37, the body 31 is formed with a transverse passage 40 which establishes communication between the outer flat surfaces 31a and 31b of said body.

For measuring the changes in stress forces in the area surrounding the sensor unit S-1, a pair of sensor elements 41 are secured by welding to the flat surfaces 31a and 31b so that the elements are disposed diametrically opposite each other.

The sensor elements are identical in construction and each is formed as an elongate metallic strip having a longitudinal recess 42 in its inner surface. The recess is defined by relatively heavy flange portions 43 along each longitudinal edge and by flange portions 44 of substantial thickness at the upper and lower ends of said recess. The wall thickness of the area 45 between the flange portions is relatively thin and flexible and overlies the space formed by the recess 42. The area 45 forms a sensing diaphragm or plate which is exposed to and is responsive to external stress so that changes in the stress forces acting thereon result in a deflection of said diaphragm.

Each sensor element 41 extends substantially throughout the longitudinal extent of the main portion of the body 31 so that the upper passages 36 and 37 have their lower ends in communication with the upper ends of the recesses 42 in the respective elements; also the transverse passage 40 (FIG. 5) in the lower portion of the body 31 communicates with the lower ends of said recesses 42 to establish communication therebetween. It is thus evident that the hydraulic system of the sensor unit S-1 is formed by the passages 36 and 37, the recesses 42 beneath each sensing element 41 and the lower passage 40. As has been noted, the passage 37 is in communication through the conductor 27 with the pressure control and filler valve 26, while the passage 36 communicates through the conductor 23 with the pressure transducer 22.

The flange portions 43 and 44 of each of the sensor elements 41 are, as noted, of substantial thickness and as illustrated in FIG. 4, the flanges engage the flat surfaces 31a and 31b of the main body portion 31 of the sensor unit. By providing the relatively thick or heavy flanges, it is possible to effectively and properly weld the sensor elements 41 to the flat surfaces of the body portion without any substantial distortion of the sensing diaphragm or plate 45 of each sensing element. This assures that the overall sensor unit S-1 may be constructed of high mechanical strength to assure that it will resist distortion or destruction by earth movements of substantial magnitude and yet, the relatively flexible sensing diaphragm or plate 45 provides the desired sensitivity to assure measurement of relatively small stress forces. Also the conductors 23 and 27 are within the interior of housing H and are not exposed to external stresses which protects them against breakage; also more accurate readings are obtainable than would be the case if the external forces acted not only upon the sensing diaphragms 45 but also upon the relatively small diameter conductors.

In prior sensing apparatus employing hydraulic fluid, it has been the practice to provide a recess or groove in the outer surface of the body of the sensing element and attempts have been made to close such recess with a relatively thin diaphragm or sensing plate. Such attempts to weld a relatively thin portion to effect the proper seal have resulted in a distortion of the plate. Also, the plate itself was not of sufficient strength to resist either distortion or destruction under excessive earth movement. Furthermore, the prior devices located the conductors to the transducer exteriorly of the assembly which not only subjected them to the external forces but also rendered them vulnerable to breakage. The present invention overcomes the disadvantages of such prior apparatus.

If only a single sensing unit is to be employed, then the sensing unit S-1 would have its lower end closed by an end piece such as shown at 50 in FIG. 2D, and in such case, the central bore 32 therethrough could be omitted.

The operation of the apparatus is evident from the foregoing. Hydraulic fluid under a predetermined pressure is introduced through the filler valve 26 into the hydraulic system formed by conductor 27, passage 37, the space beneath the sensing diaphragm or plate portions 45 of the sensing elements, which are interconnected by passage 40, the passage 36 and conductor 23 which is connected to the lower portion of the transducer 22. By means of the pressure control and filling valve 26, the hydraulic fluid is placed under a predetermined pressure in accordance with the conditions which are to be measured.

The apparatus is then mounted within the bore 11 and the grouting material is introduced so that the apparatus is solidly retained within said bore and the diaphragm or sensing plate portion 45 of each element 41 will be subjected to the changes in stress forces within the formation. Any changes in the stress forces acting upon the sensing diaphragms or plate portions 45 of the elements 41 will result in a change in the hydraulic pressure within the system. This change in hydraulic pressure is transmitted through the conductor 23 to the pressure transducer 22, thereby resulting in a variation in the electrical signal being conducted through cables 24 and 124 to the indicator 14. The change in hydraulic pressure is directly related to any change in the formation stress forces so that said stress forces may be monitored and indicated by the indicating device 14.

When more than one sensing unit is employed, the first sensing unit has a reduced cylindrical coupling portion 46 at the end which is opposite the passage 36 and 37 (FIG. 2B). This end portion is similar to the end portion 33 of the body 31 and is adapted to slide within a spacer tube T. O-rings 47 mounted on the end portion 46 seal with the end of the tube and fastening screws 48 connect the parts to each other. The spacer tube T may be of any desired length and at its opposite end encompasses and is connected with the end portion 33a of the body 31a of the second sensing unit S-2. As shown in FIG. 2C, the sensor unit S-2 is constructed in an identical manner to that of the first sensor S-1 and includes the central bore 32a, diametrically opposed sensor elements 41a having sensing diaphragms 45a, the upper passages 36a and 37a and the lower connecting passage 40a. It is noted that the sensor elements 41a are disposed diametrically opposite each other (FIG. 6), but are offset in a radial or diametrical plane from the elements 41 of the sensor unit S-1. Passage 36a of the sensor unit S-2 is connected through the conductor 23a with the transducer 22a in the housing H. Similarly, the passage 27a of said second sensor unit is connected through the fluid conductor 27a with the second pressure control and filler valve 26a and both conductors 26a and 27a extending upwardly through the central bore 31 of the first sensor so as to be protected from external stresses.

The sensor unit S-2 operates in an identical manner to that described in connection with sensor S-1 and its hydraulic system measures the variations in formation stress which are acting upon the sensor element 41a of said second sensor unit.

If a third sensor unit S-3 is used, a second spacer designated T in FIGS. 2C and 2D is connected to the reduced cylindrical portion 46a of the second sensor unit. This spacer may be of any desired length to locate the third sensor a desired distance from the second one. The third sensor unit S-3 is constructed in an identical manner to the other sensor units excepting only it has no central bore. The third unit includes a main body 231, an upper cylindrical reduced end 33b and a lower cylindrical end 46b and a transverse connecting passage 40b, extending between the recesses 42b of the sensor elements 41b. The sensor elements 41b, including sensing diaphragm portions 45b, are diametrically opposed and located in a different radial or diametrical plane than either the sensing elements of units S-1 and S-2 (FIG. 7). Passages 36b and 37b connect with the conductors 23b and 27b so that hydraulic fluid may fill the system of the unit S-3 and said conductors extend upwardly through the bore 32A of unit S-2 and bore 32 of unit S-1 so as to be protected against external forces. The end piece 50 encircles and is secured to the reduced end 46b of unit S-3 to complete the overall tool assembly or apparatus.

Since each of the units S-2 and S-3 operate in the manner described with respect to the sensing unit S-1, it is not deemed necessary to repeat a description of their operation. It is noted, however, that where a plurality of sensing units is employed, the sensing elements may be located in different diametrical or radial planes, whereby each sensing unit carries out a measurement in a different direction. Where only a single sensing unit is employed, such sensing unit may be oriented to locate its sensing elements in a predetermined plane so that measurements may be taken in a known direction.

The basic design of the units S-1, S-2 and S-3 is such that the same may be assembled in various manners to obtain desired and selected measurements along a predetermined longitudinal path and also in a known direction. For example, if the units are connected together by relatively short spacers and the sensing elements of each unit are in longitudinal alignment with the respective sensing elements of the other units, the particular measurements will be made along the same longitudinal plane in a particular formation; by varying the internal pressures in each sensor unit, as compared to the pressure in the other units, the particular indications would provide a readout from which characteristics of the medium or subsurface formation in which the tool is installed, may be determined. One such characteristic might be the ease or resistance to flow through certain kinds of subsurface formation or rock which is referred to in the art as the plasticity of the rock. It thus becomes obvious that with the type of sensor unit herein provided, together with the accurate control of the presssure in the hydraulic system of each unit, measurements of various types in subsurface formations may be accomplished.

It may be desired to provide a temperature measurement so that the formation temperature may be related to the pressure indication. It is well known that underground temperature changes will effect a change in the pressure of hydraulic fluid and may effect the final readout and if this temperature change is known, then it may be compensated for and taken into consideration so that the final indications by the indicating means 14 of stress force variations will be accurate.

In order to monitor temperature changes, a temperature responsive element 51 may be mounted within the spacer tube T which is located between the sensing units S-1 and S-2. As shown in FIG. 2C, this unit may be connected by a clamp 52 to the conductors 23a, 23b, 27a and 27b. Extending from the temperature responsive element 51 is its own conductor 53 which will extend upwardly through the bore 32 in the first sensor unit and into and through the housing H. As shown in FIG. 2A, the temperature cable 53 may be contained within the conduit C and may then extend to the indicating means 14 which will, of course, have a temperature indicator incorporated therein. If desired, more than one temperature responsive means may be located within the apparatus at various spaced points.

Any desired type of temperature responsive means or sensor may be employed since there are many well known in the art. One example of a temperature transducer type which has been found suitable for the purpose is a type 1580 manufactured by Transconics, Inc. of Burlington, Massachusetts; another type is type TMS 108 transducer manufactured by the Celesco Industries, Inc. of Conoga Park, California. By mounting one or more temperature sensors within the assembly, the temperature of the area under investigation may be related to the pressure indications to provide accurate measurement in changes in the stress forces.

The foregoing disclosure and description of the invention are illustrative and explanatory thereof and various changes in the size, shape and materials, as well as in the details of the illustrated construction, may be made within the scope of the appended claims without departing from the spirit of the invention.

What I claim is:

1. A stress measuring apparatus including,
    a sensor unit adapted to be located in the area in which stress measurements are to be made,
    said sensor unit comprising a body having an internal passage extending from one end thereof to the exterior surface of said body,
    an elongated sensor element extending longitudinally of the body in overlying relationship to that end of said internal passage which exits to the exterior surface of the body,
    said sensor element having its internal surface recessed to form a longitudinally extending space within the element and a peripheral area of of sufficient thickness in order to permit welding of said element to the body without distortion, said element communicating with the internal passage of the body and having its external surface exposed to the area under measurement, so that the stress forces within the area act upon said external surface of said sensor element,
    a hydraulic fluid filling said internal passage and said space within the sensor element, said sensor element being responsive to changes in stress forces acting upon the exterior of the sensor element, which changes are transmitted to the hydraulic fluid to vary the pressure of said hydraulic fluid accordingly,
    means for indicating the variations in the hydraulic fluid pressure as caused by changes in stress, and
    means establishing communication between the internal passage of said body and said indicating means to transmit hydraulic fluid pressure variations to the indicating means.

2. A stress measuring apparatus as set forth in claim 1, wherein
    the elongate sensor element is in the form of a metallic strip having inwardly directed flanges at its longitudinal sides and along its transverse ends,
    said flanges having sufficient thickness to assure proper welding of the flanges to the exterior of the body without distortion of the main portion of the strip element, whereby said main portion of the element may be maintained relatively thin to retain high flexibility and thereby assure accurate measurement of relatively small stress changes.

3. A stress measuring apparatus as set forth in claim 1, wherein
    the means for indicating pressure variations in the hydraulic fluid to measure the stress force includes
    a pressure transducer for converting said hydraulic fluid pressure variations into electrical signals, and
    electrical indicating means operatively connected with the transducer for indicating said variations to thereby measure the stress forces acting upon the sensor element.

4. A stress measuring apparatus as set forth in claim 3, wherein
    the electrical indicating means is located at a point remote from the area under measurement.

5. A stress measuring apparatus including,
    a housing,
    a sensor unit,
    said housing and sensor unit forming an assembly which is adapted to be located in the area in which stress measurements are to be made,
    said sensor unit comprising a body having an internal passage extending from one end thereof to a point on the exterior surface which point is spaced from said end,
    an elongate strip-like sensor element welded to the exterior of the sensor body and overlying that end of the passage which exits to the exterior surface of the body,
    said sensor element having its internal surface recessed to form a space beneath the element which communicates with the internal passage of the body and having its external surface exposed to the area under measurement,
    the space formed in said sensor element being defined by inwardly directed flanges at its longitudinal sides and along its transverse edges, which flanges have sufficient thickness to assure proper welding of the flanges to the exterior of the body without distortion of the main portion of the strip element,
    a hydraulic fluid filling said internal passage and said space within the sensor element responsive to changes in stress forces acting upon the exterior of the sensor element, which changes are transmitted to the hydraulic fluid to vary the pressure of said hydraulic fluid accordingly,
    a pressure transducer within the housing and a conductor establishing communication between said transducer and the internal passage of the sensor unit body, whereby variations in pressure of the hydraulic fluid as caused by the changes in stress forces acting upon the sensor element are measured and converted into electrical signals representative of such variations, and
    indicating means actuated by electrical signals to indicate the changes in stress as measured by the sensor element and transducer.

6. A stress measuring apparatus as set forth in claim 5 wherein the indicating means is remotely located with respect to the housing and sensor unit assembly.

7. A stress measuring apparatus as set forth in claim 5, together with a pressure control and filling valve located within the housing and having communication with the internal passage of the sensor unit body,
    said valve having means for introducing hydraulic fluid into the internal passage of the sensor unit body and also having means for maintaining a predetermined hydraulic fluid pressure within the system.

8. A stress measuring apparatus as set forth in claim 5 wherein the strip-like sensor element is formed with inwardly directed flanges at its longitudinal sides and along its transverse ends, said flanges having sufficient thickness to permit proper welding of the flanges to the exterior of the body without distortion of the main portion of the element whereby said main portion may be maintained relatively thin to retain high flexibility so as to assure accurate measurement of relatively small stress changes.

9. A stress measuring apparatus including, a housing, a plurality of sensor units, a plurality of tubular spacer members connecting said housing and said sensor units in preselected spaced relationship, said housing, spacer member and spacer units forming an assembly which is adapted to be located in the area in which stress measurements are to be made, each sensor unit comprising a body having an internal passage extending from one end thereof to a point on the exterior surface which point is spaced from said end, a pair of elongate strip-like sensor elements welded to the exterior of each sensor body and overlying that end of the passage which exits to the exterior surface of the body, said sensor elements being located diametrically opposite each other on the body, each sensor element having its internal surface recessed to form a space beneath the element which communicates with the internal passage of the body and having its external surface exposed to the area under measurement, means communicating the spaces beneath the sensor elements to permit flow of fluid therebetween, the space formed in said sensor element being defined by inwardly directed flanges at its longitudinal sides and along its transverse edges, which flanges have sufficient thickness to assure proper welding of the flanges to the exterior of the body without distortion of the main portion of the strip element, a hydraulic fluid filling the internal passage and the spaces within the sensor elements of each unit and responsive to changes in stress forces acting upon the exteriors of the sensor elements of each unit, which changes are transmitted to the hydraulic fluid to vary the pressure of said hydraulic fluid accordingly, a plurality of pressure transducers, one for each sensor unit mounted within the housing, a conductor establishing communication between each transducer and the internal passage of the sensor unit body with which the transducer is associated, whereby variations in the pressure of the hydraulic fluid as caused by changes in stress forces acting upon the sensor elements of that unit are measured and converted into electrical signals representative of such variations, and indicating means actuated by the electrical signals to indicate the changes in stress as measured by the sensor elements and their respective pressure transducers.

10. A stress measuring apparatus as set forth in claim 9 wherein the diametrically opposed sensor elements of one sensor unit are offset in radial planes from the diametrically opposed sensor elements of the other sensor units, whereby each sensor unit measures stresses in a different plane.

11. A stress measuring apparatus as set forth in claim 9 wherein each sensor unit body has a reduced end to slidably fit within the tubular housing and within the tubular spacer member to provide a slip joint connection, sealing means carried by said reduced portion and a fastening means connecting the housing and the spacer members to the reduced ends of each sensor unit.

12. A stress measuring apparatus as set forth in claim 9 wherein the conductor which establishes communication between each transducer and the internal passage of the sensor unit body are all located interiorly of the assembly and are not exposed to the stress forces which are acting on the sensing elements.

13. In a stress measuring apparatus, a sensor unit including, an elongate body having diametrically opposed sides formed of flat surfaces, elongate sensor elements extending longitudinally of the body along said flat surfaces and welded to said body, each sensor element having its internal surface recessed to form a longitudinally extending space between the element and the exterior of the body, each sensor element having inwardly directed flanges at its longitudinal sides and along its transverse ends, said flanges having sufficient thickness to assure proper welding of the flanges to the exterior of the body without distortion of the main portion of the sensor element, whereby said main portion may be maintained relatively thin to retain high flexibility while assuring proper attachment of the element to the body, said body having passages which communicate with the spaces beneath the sensor elements and extend to one end of said sensor element, and means for filling said passages and said spaces with a hydraulic fluid under predetermined pressure, whereby any movement of the flexible main portion of the sensor elements is reflected by variations in the pressure of the hydraulic fluid.

* * * * *